Figure 1:
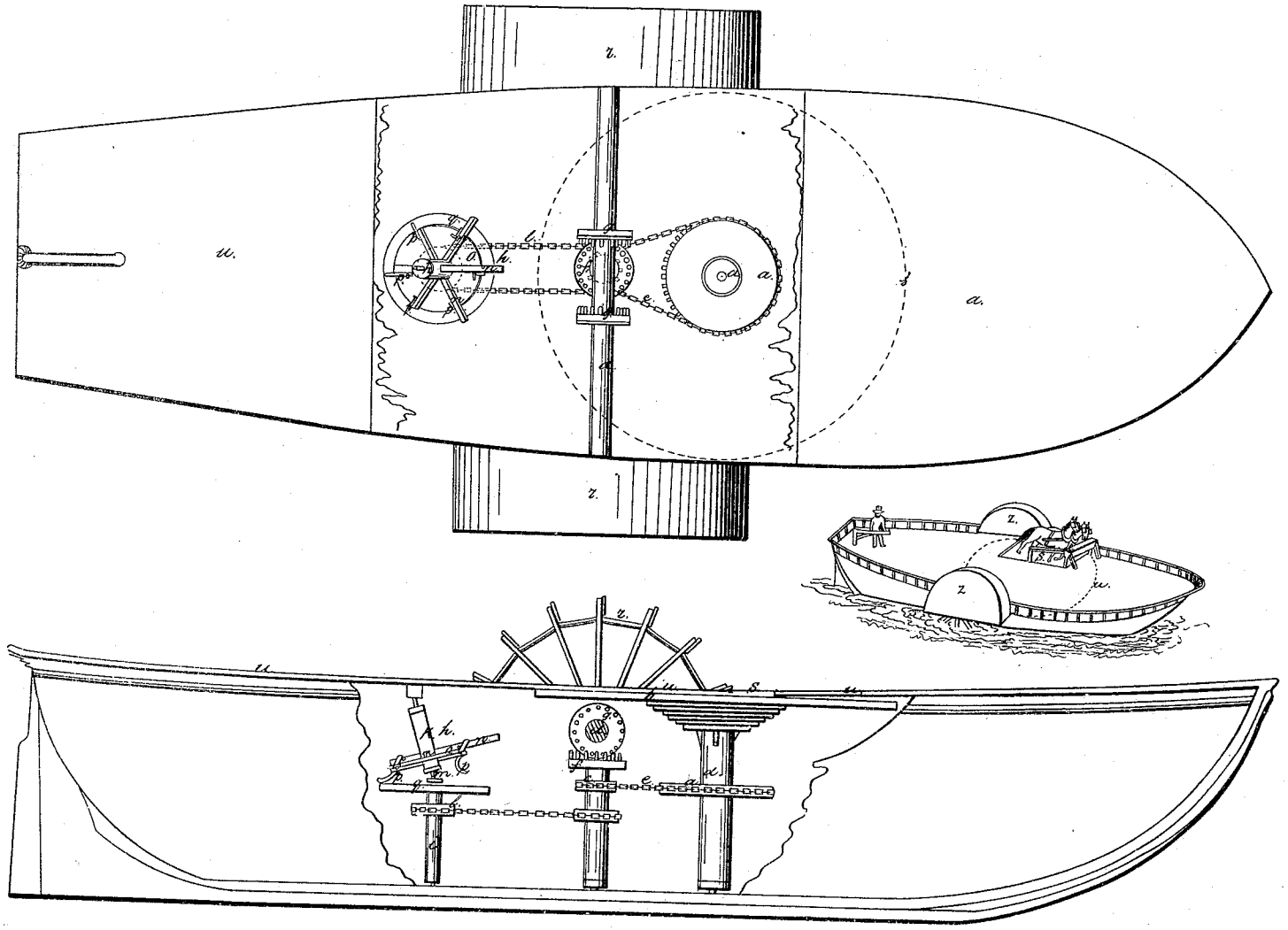

3112X

B. Langdon.
Paddle Wheel.

No

Patented Jun. 5, 1819.

N. PETERS, PHOTO-LITHOGRAPHER, WASHINGTON, D. C.

3112X
Sheet 2. 2 Sheets.
B. Langdon.
Paddle Wheel.
Patented Jun. 5, 1819.
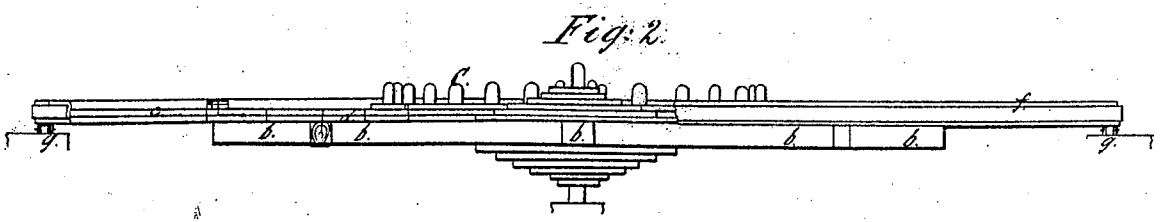
Fig. 2.
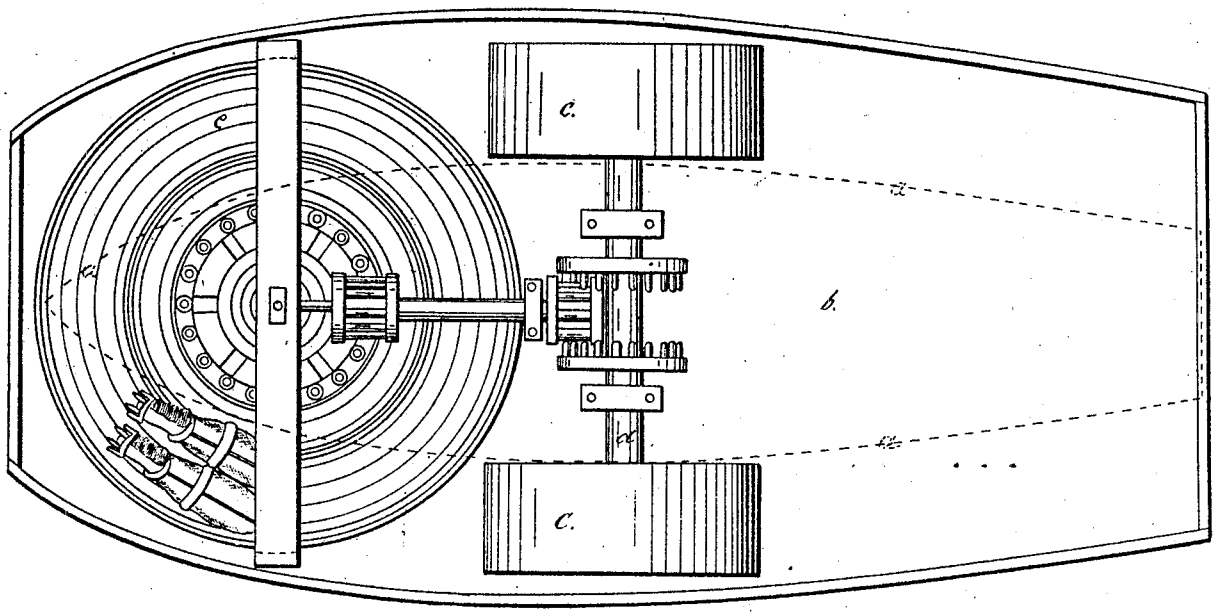
N. PETERS, PHOTO-LITHOGRAPHER, WASHINGTON, D. C.

MISSING PAGE TEMPORARY NOTICE

PATENT # 3112X FOR ISSUE DATE 6-5-1819

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text